United States Patent
Li (10) Patent No.: US 11,368,568 B2
(45) Date of Patent: Jun. 21, 2022

(54) MOBILE TERMINAL AND IMAGE ACQUISITION MODULE

(71) Applicant: GUANGDONG OPPO MOBILE TELECOMMUNICATIONS CORP., LTD., Guangdong (CN)

(72) Inventor: Biao Li, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/698,789

(22) Filed: Nov. 27, 2019

(65) Prior Publication Data

US 2020/0177717 A1 Jun. 4, 2020

(30) Foreign Application Priority Data

Nov. 30, 2018 (CN) .......................... 201822001397.2

(51) Int. Cl.
*H05K 5/00* (2006.01)
*H04M 1/02* (2006.01)
*G06V 40/13* (2022.01)

(52) U.S. Cl.
CPC .......... *H04M 1/0264* (2013.01); *G06V 40/13* (2022.01); *H04M 1/0266* (2013.01)

(58) Field of Classification Search
CPC .................................. H05K 5/00; G06F 3/01
See application file for complete search history.

(56) References Cited

U.S. PATENT DOCUMENTS

| 2006/0033832 | A1 | 2/2006 | Shin | |
|---|---|---|---|---|
| 2007/0279481 | A1* | 12/2007 | Chambers | H04N 5/2251 348/14.01 |
| 2019/0260943 | A1* | 8/2019 | Strobert, Jr. | F16M 11/041 |

FOREIGN PATENT DOCUMENTS

| CN | 2919296 Y | 7/2007 |
|---|---|---|
| CN | 204013814 U | 12/2014 |
| CN | 106094990 A | 11/2016 |
| CN | 206442416 U | 8/2017 |
| CN | 107483779 A | 12/2017 |
| CN | 207117767 U | 3/2018 |
| CN | 207504996 U | 6/2018 |
| CN | 207968581 U | 10/2018 |

(Continued)

OTHER PUBLICATIONS

The international search report for the PCT application No. PCT/CN2019/120271, dated Feb. 26, 2020.

(Continued)

*Primary Examiner* — Jerry Wu
(74) *Attorney, Agent, or Firm* — Ladas & Parry, LLP (57) ABSTRACT

The present disclosure relates to a mobile terminal and an image acquisition module. The image acquisition module includes a mounting seat, a camera assembly, and a light source. The mounting seat includes a pedestal and a light transmission member, the light transmission member is coupled to the pedestal, wherein the pedestal and the light transmission member cooperatively define a receiving cavity; the camera assembly has an incident face, the camera assembly is arranged in the receiving cavity, and the incident face exposes from the light transmission member; a light source is configured to emit light transmitting through the light transmission member.

15 Claims, 6 Drawing Sheets

(56) References Cited

FOREIGN PATENT DOCUMENTS

| EP | 3211507 A1 | 8/2017 |
| EP | 3477922 A1 | 5/2019 |
| WO | 2018128815 A1 | 7/2018 |

OTHER PUBLICATIONS

The extended European search report for EP patent application No. 19209647.7, dated Feb. 27, 202.
The examination report for the IN patent application No. 201914048186, dated Mar. 15, 2021.
The Communication pursuant to Article 94(3) EPC for EP patent application No. 19209647.7, dated Jan. 27, 2021.

* cited by examiner

MOBILE TERMINAL AND IMAGE ACQUISITION MODULE

CROSS-REFERENCE TO RELATED APPLICATION(S)

The present disclosure claims priority to Chinese Patent Application No. 201822001397.2, filed on Nov. 30, 2018 and entitled "Mobile Terminal and Image Acquisition Module", the contents of which are hereby incorporated by reference in its entirety.

TECHNICAL FIELD

The present disclosure relates to a technical field of mobile terminals, and more particularly to a mobile terminal and an image acquisition module.

BACKGROUND

Along with popularization of mobile terminals such as mobile phones and tablet computers, mobile terminal has become an indispensable part of people's work and lives. A user not only requires a, simple communication function of a mobile terminal, but also pays more attention to a user experience of the mobile terminal. However, a related mobile terminal, during shooting, may not enrich shooting environments but only meet a shooting requirement, which makes a shooting experience not so good.

SUMMARY

In an aspect of the present disclosure, an image acquisition module is provided, which comprises:
a mounting seat comprising a pedestal and a light transmission member, the light transmission member being coupled to the pedestal, wherein the pedestal and the light transmission member cooperatively define a receiving cavity;
a camera assembly having an incident face, the camera assembly being arranged in the receiving cavity and the incident face exposing from the light transmission member; and
a light source configured to emit light transmitting through the light transmission member.

In another aspect of the present disclosure, a mobile terminal is provided, which comprises:
a terminal device, in which a mounting groove is defined; and
an image acquisition module, arranged at the mounting groove and capable of moving relative to the terminal device to a first position and a second position, wherein the image acquisition module comprises a mounting seat, a camera assembly and a light source; the mounting seat comprises a pedestal and a light transmission member, the light transmission member is coupled to the pedestal, and the pedestal and the light transmission member cooperatively define a receiving cavity; the camera assembly has an incident face, the camera assembly is arranged in the receiving cavity, and the incident face exposes from the light transmission member; the light source is configured to emit light transmitting through the light transmission member; at the first position, the mounting groove accommodates the image acquisition module and the incident face is kept-hidden in the terminal device; and at the second position, the image acquisition module extends from the mounting groove, and the incident face exposes from the terminal device.

In an additional aspect of the present disclosure, a mobile terminal is provided, which comprises:
a terminal device, in which a mounting groove is defined; and
an image acquisition module, arranged at the mounting groove and capable of moving relative to the terminal device to a first position and a second position, wherein the image acquisition module comprises a mounting seat, a camera assembly and a light source; the mounting seat comprises a pedestal and a light transmission member, the light transmission member is coupled to the pedestal, and the pedestal and the light transmission member cooperatively define a receiving cavity; the camera assembly has an incident face, the camera assembly is arranged in the receiving cavity, and the incident face exposes from the light transmission member; the light source is configured to emit light transmitting through the light transmission member.

BRIEF DESCRIPTION OF THE DRAWINGS

In order to describe the technical solutions in embodiments of the present disclosure or a conventional art more clearly, the drawings required to be used for descriptions about the embodiments or the conventional art will be simply introduced below. It is apparent that the drawings described below are only some embodiments of the present disclosure. Those of ordinary skill in the art may further obtain other drawings according to these drawings without creative work.

DETAILED DESCRIPTION OF THE EMBODIMENTS

For conveniently understanding the present disclosure, the present disclosure will be described below more comprehensively with reference to related drawings. The preferred embodiments of the present disclosure are shown in the drawings. However, the present disclosure is able to get implemented in many different forms and is not limited to the embodiments described herein. Instead, these embodiments are provided to make the contents disclosed in the present disclosure more thoroughly and comprehensively.

"Terminal device" used here includes, but not limited to, a device connected in any one or more of the following connection manners and capable of receiving and/or sending a communication signal:

(1) a wired connection manner, for example, a Public Switched Telephone Network (PSTN), a Digital Subscriber Line (DSL), a digital cable and direct cable connection; and (2) a wireless interface manner, for example, a cellular network, a Wireless Local Area Network (WLAN), a digital television network like a Digital Video Broadcasting Handheld (DVB-H) network, a satellite network and an Amplitude Modulation (AM)-Frequency Modulation (FM) broadcast transmitter.

A terminal device configured to communicate by a wireless interface may be called an "image acquisition module". Examples of the image acquisition module include, but not limited to, the following image acquisition modules:

(1) a satellite phone or a cell phone;

(2) a Personal Communication System (PCS) terminal capable of integrating a cellular radio phone and data processing, faxing and data communication capabilities;

(3) a radio phone, a pager, Internet/Intranet access, a Web browser, a memo pad, a calendar and a Personal Digital Assistant (PDA) equipped with a Global Positioning System (GPS) receiver;

(4) a conventional laptop and/or palmtop receiver; and (5) a conventional laptop and/or palmtop radio phone transceiver and the like.

Figure 1:
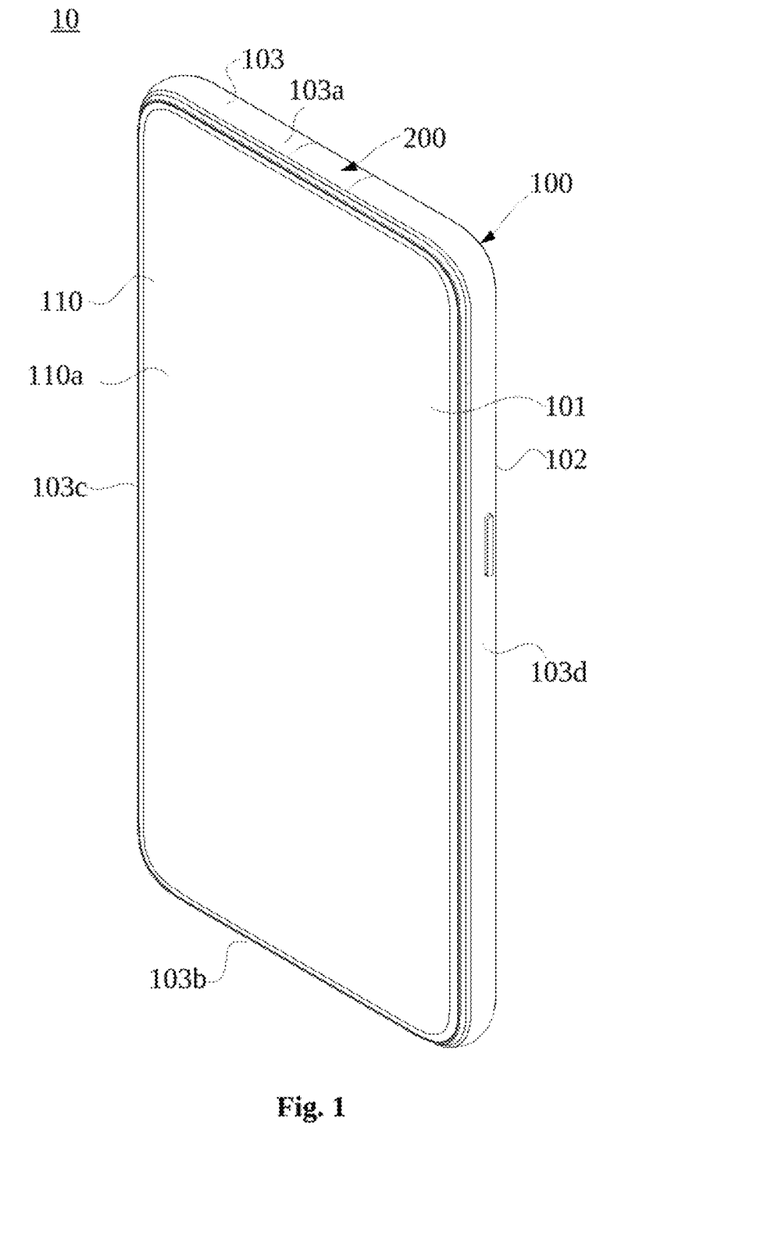
FIG. 1 is a structure diagram when an image acquisition module in a mobile terminal according to an embodiment is at a first position.
Figure 2:
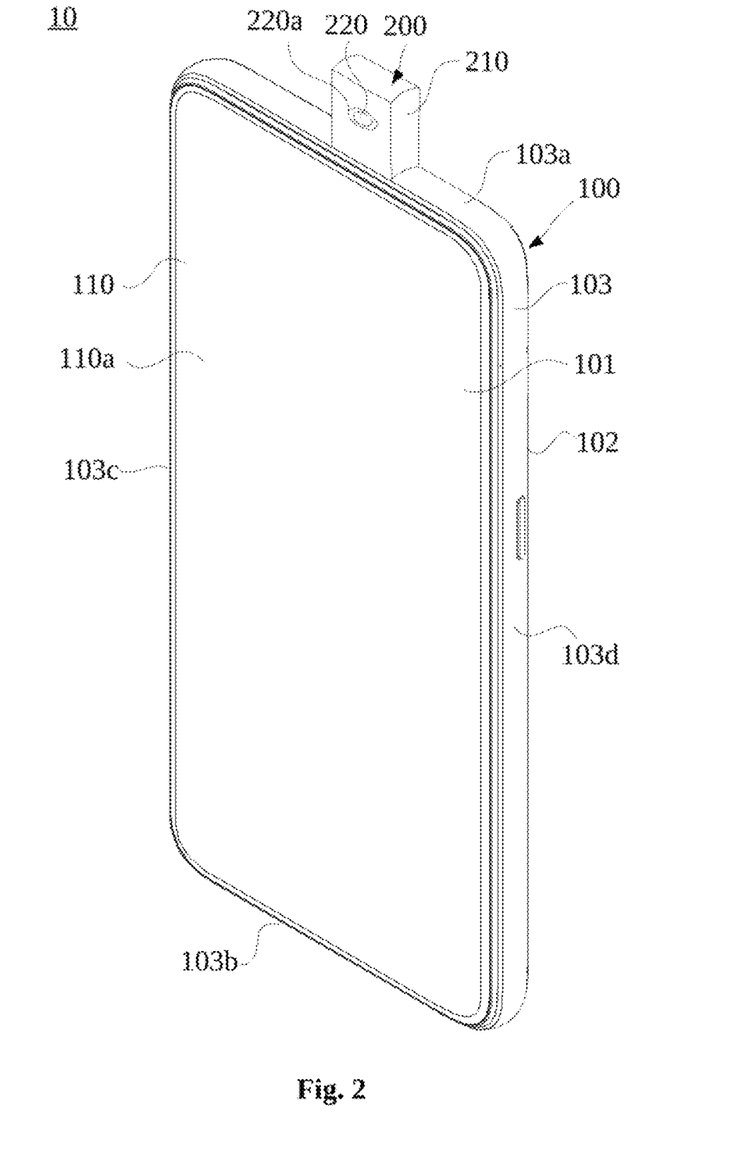
FIG. 2 is a structure diagram when an image acquisition module in a mobile terminal according to an embodiment is at a second position.

Referring to FIG. 1 and FIG. 2, in an embodiment, a mobile terminal 10 is a smart phone, and may also be a tablet computer. The mobile terminal 10 includes a terminal device 100 and an image acquisition module 200.

The terminal device 100 includes a first face 101, a second face 102 opposite the first face 101, and a lateral peripheral face 103 coupled between the first face 101 and the second face 102. The terminal device 100 is provided with a mounting groove, and the mounting groove passes through the lateral peripheral face 103. In some exemplary embodiments, the terminal device 100 is substantially of a rectangular block shaped, the lateral peripheral face 103 includes a top lateral face 103a, a bottom lateral face 103b, a left lateral face 103c and a right lateral face 103d, the top lateral face 103a is opposite to the bottom lateral face 103b, and the left lateral face 103c is opposite to the right lateral face 103d. The top lateral face 103a and the bottom lateral face 103b are positioned between the left lateral face 103c and the right lateral face 103d, and the left lateral face 103c and the right lateral face 103d are positioned between the top lateral face 103a and the bottom lateral face 103b.

The image acquisition module 200 is arranged at the mounting groove, and is able to move relative to the terminal device 100 to a first position and a second position. In combination with FIG. 3 and FIG. 4, the image acquisition module 200 includes a mounting seat 210, a camera assembly 220 and a light source 230, and the camera assembly 220 has an incident face 220a. In some exemplary embodiments, the mounting groove is able to pass through a plurality of lateral faces of the lateral peripheral face 103. For example, in the mobile terminal 10 shown in FIG. 1 and FIG. 2, the mounting groove only passes through the top lateral face 103a, and correspondingly, the image acquisition module 200 is able to extend from or retract into the mounting groove from the top lateral face 103a. In other exemplary embodiments, the mounting groove is also able to pass through the left lateral face 103d or the bottom lateral face 103b only, or the mounting groove passes through both the top lateral face 103a and the right lateral face 103d. There are no limits made herein.

At the first position, the image acquisition module 200 is accommodated in the mounting groove, and the incident face 220a is kept hidden in the terminal device 100, so that an arrangement space on a side where the first face 101 or the second face 102 is positioned may be prevented from being occupied, the first face 101 and the second face 102 are relatively complete, and furthermore, when a display screen 110 is arranged on the first face 101 or the second face 102, a display region 110a of the display screen 110 is able to make larger to increase a screen-to-body ratio. For example, in some exemplary embodiments, the display screen 110 of the terminal device 100 is arranged on the side where the first face 101 is positioned or the side where the second face 102 is positioned. To be precise, the display region 110a of the display screen 110 faces the side where the first face 101 is positioned or the side where the second face 102 is positioned. The display screen 110 is configured to display information and provide an interaction interface for a user to meet a using requirement on the terminal device 100. In some exemplary embodiments, display screens 110 are arranged on both the side where the first face 101 is positioned and the side where the second face 102 is positioned to achieve a double-screen display effect. In other exemplary embodiments, the display screen 110 is able to get a flexible screen, and has a first display region and a second display region, the first display region faces the side where the first face 101 is positioned, and the second display region faces the side where the second face 102 is positioned, so that a double-sided display effect may also be achieved. Elaborations are omitted herein.

At the second position, the image acquisition module 200 extends from the mounting groove, and the incident face 220a exposes from the side where the first face 101 is positioned. Therefore, shooting towards the side where the first face 101 is positioned is able to implement. It is to be noted that, when the display region 110a of the display screen 110 faces the side where the first face 101 is positioned, a glass cover plate covering the display screen 110 forms part or all of the first face 101. In such case, the incident face 220a exposes from the side where the first face 101 is positioned, and this means that the camera assembly 220 is able to shoot towards a side where the display region 110a of the display screen 110 is positioned. Correspondingly, in some other exemplary embodiments, the display region 110a of the display screen 110 faces the side where the second face 102 is positioned, so that, when the incident face 220a exposes from the side where the first face 101 is positioned, a shooting direction of the camera assembly 220 is opposite the second face 102, namely shooting opposite the side where the display region 110a of the display screen 110 is implemented.

Figure 3:
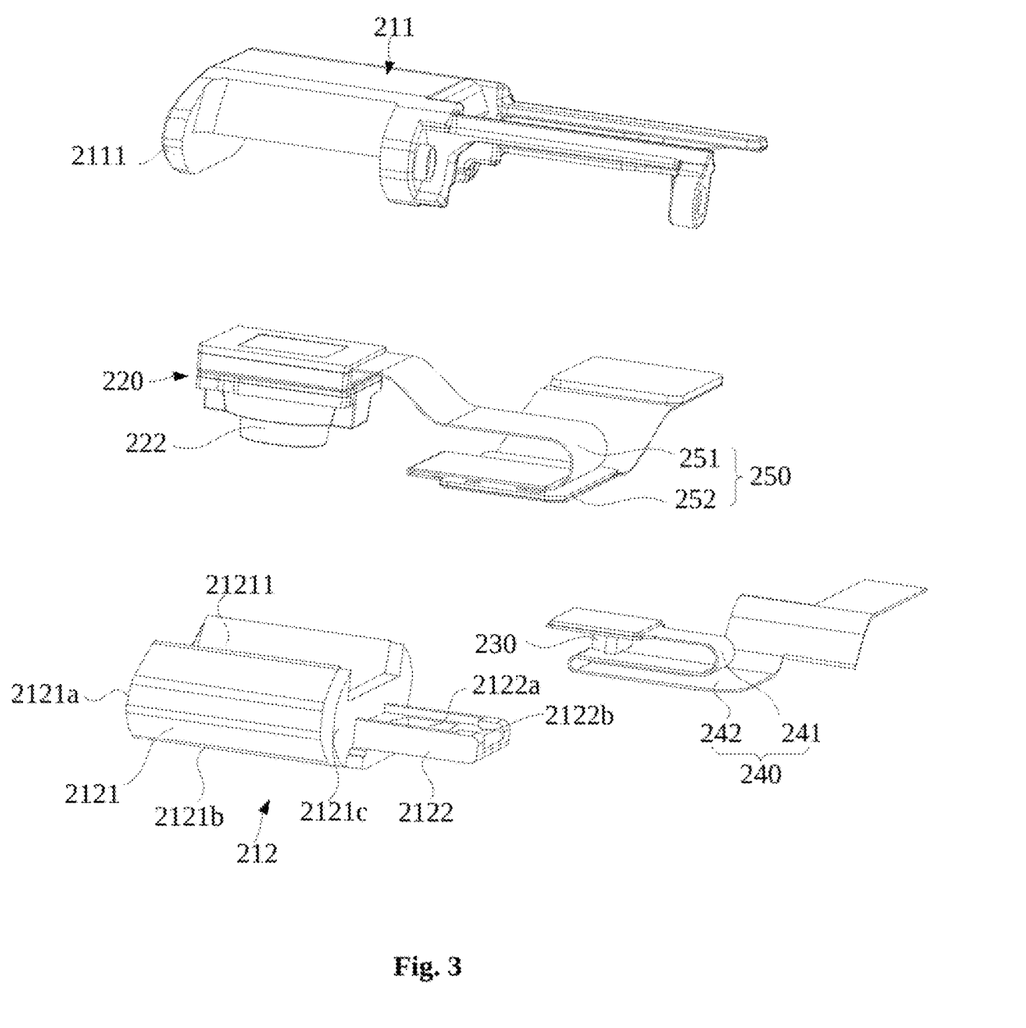
FIG. 3 is an exploded structure diagram of an image acquisition module according to an exemplary embodiment.
Figure 4:
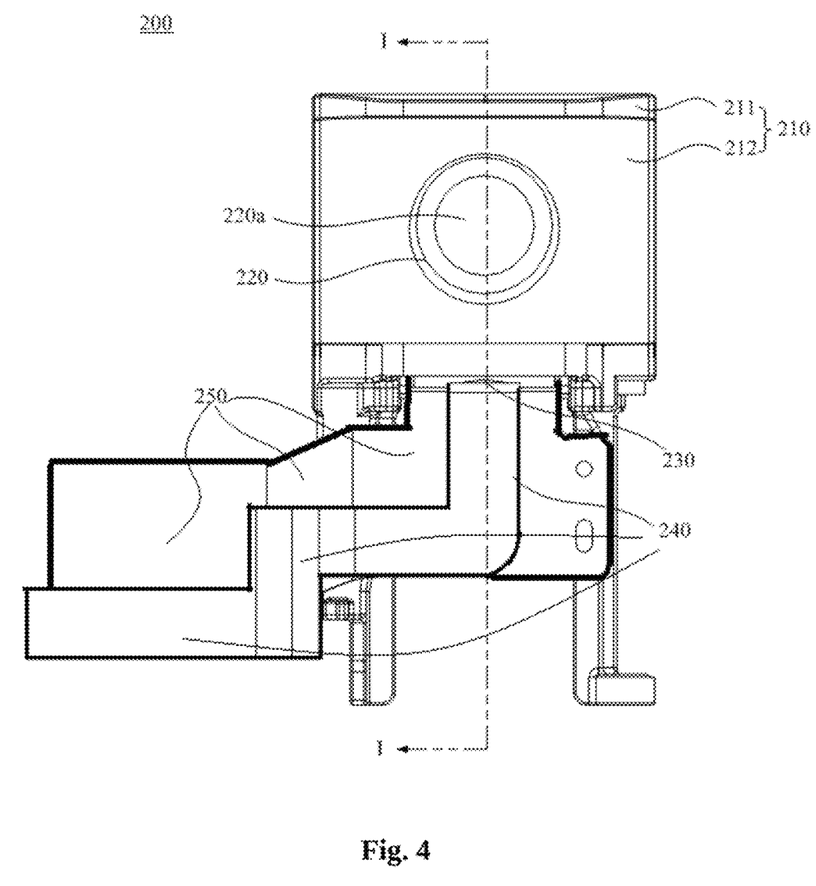
FIG. 4 is a front view of an assembled structure of an image acquisition module according to an exemplary embodiment.

In combination with FIG. 3 and FIG. 4, the mounting seat 210 includes a pedestal 211 and a light transmission member 212, the light transmission member 212 is coupled to the pedestal 211, and a receiving cavity is formed between the light transmission member 212 and the pedestal 211. The camera assembly 220 is arranged in the receiving cavity, and the incident face 220a exposes from the light transmission member 212. Light emitted by the light source 230 is transmittable, by the light transmission member 212, to a side where the incident face 220a is positioned. By such arrangement, the light of the light source 230 is transmitted from the side where the incident face 220a is positioned by use of the light transmission member 212, thereby achieving a relatively good light effect outside the camera assembly 220, improving the whole aesthetics of the camera assembly 220 and improving a shooting experience.

The light transmission member 212 may be made from a light transmission glass material such as optical quartz glass and ultraviolet transmission glass, and may also be made from a plastic material with relatively high light transmittance such as polymethyl methacrylate (PMMA), polystyrene (PS) and polycarbonate (PC). In addition, the light transmission member 212 and the pedestal 211 is able to connect into a whole in a buckle connecting manner without any connecting piece-such as a screw and a jackscrew, so that the number of parts is reduced, and assembling is facilitated. In other exemplary embodiments, the light transmission member 212 may also be adhered to the pedestal 211 by glue, which may also firmly connect the light transmission member 212 to the pedestal 211 to form the receiving cavity.

The image acquisition module 200 includes a first flexible printed circuit 240 and a second flexible printed circuit 250, and a main board is arranged in the terminal device 100. The light source 230 is electrically connected to the main board by the first flexible printed circuit 240 such that the main board may control the light source 230. For example, when the image acquisition modules 200 moves out of the mounting groove, the main board controls the light source 230 to emit a beam to achieve a light effect on the side where the incident face 220a of the camera assembly 220 is positioned. It is to be noted that the light source 230 is a Light-Emitting Diode (LED) lamp, may emit monochromatic light, and may also emit red, green or yellow light, to achieve different light effects. There are no limits made herein. The camera assembly 220 is electrically connected with the main board by the second flexible printed circuit 250 such that the main board may control a shooting state of the camera assembly 220 for adaptation to a shooting requirement. In some exemplary embodiments, after the light transmission member 212 is coupled to the pedestal 211, a wire passage opening is reserved therebetween such that the second flexible printed circuit 250 passes through the wire passage opening to be electrically connected to the camera assembly 220 in the receiving cavity. In other exemplary embodiments, a connecting port electrically connected to the camera assembly 220 is formed in the pedestal 211, so that the second flexible printed circuit 250 is electrically connected to the camera assembly 220 when the second flexible printed circuit 250 is coupled to the connecting port, and furthermore, when the second flexible printed circuit 250 is electrically connected to the main board, a current or a signal is transmitted between the main board and the camera assembly 220 to implement shooting control of the main board over the camera assembly 220.

The first flexible printed circuit 240 and the second flexible printed circuit 250 is electrically connected to the main board through a board-to-board connector. For example, for the first flexible printed circuit 240, a connector plug is arranged on the first flexible printed circuit 240, a connector jack is formed in the main board, and the connector plug mates with the connector jack to implement electrical connection between the connector plug and the connector jack. In other exemplary embodiments, the first flexible printed circuit 240 and the second flexible printed circuit 250 may also be coupled to the main board in a welding manner. There are no limits made herein.

Still referring to FIG. 3, the first flexible printed circuit 240 has a first retractable section 241, and the second flexible printed circuit 250 has a second retractable section 251. When the image acquisition module 200 moves relative to the terminal device 100, the first retractable section 241 and the second retractable section 251 extend or retract. In such an arrangement manner, when the image acquisition module 200 moves relative to the terminal device 100, the first flexible printed circuit 240 and the second flexible printed circuit 250 may adaptively extend or retract, which ensures that the first flexible printed circuit 240 and the second flexible printed circuit 250 may move independently relative to each other, so that interference caused by intertwining of the first flexible printed circuit 240 and the second flexible printed circuit 250 to the image acquisition module 200 is avoided, a movement effect of the image acquisition module 200 is effectively ensured, and the first flexible printed circuit 240 and the second flexible printed circuit 250 are prevented from being damaged during movement of the image acquisition module 200.

In some exemplary embodiments, when the image acquisition module 200 moves to the first position, the first retractable section 241 bends to wrap a part of a structure of the light transmission member 212. That is, at the first position, a part of a structure of the light transmission member 212 is accommodated in a space formed by bending of the first retractable section 241, so that an internal mechanism of the terminal device 100 is more compact, which is adoptable for lightening and thinning of the terminal device 100.

In some exemplary embodiments, at the first position, the second retractable section 251 bends to wrap the first retractable section 251, so that a layout of the first flexible printed circuit 240 and the second flexible printed circuit 250 is more compact, an internal space of the terminal device 100 may be used completely, and lightening and thinning design of the terminal device 100 is facilitated. In addition, in such an arrangement manner, the flexible printed circuit 240 and the second flexible printed circuit 250 may be stacked together, so that the first retractable section 241 and the second retractable section 251, when the image acquisition module 200 moves relative to the terminal device 100, may synchronously extend or retract without interference therebetween.

In some exemplary embodiments, the first flexible printed circuit 240 has a first connecting section 242 coupled to the first retractable section 241, the second flexible printed circuit 250 has a second connecting section 252 coupled to the second retractable section 251, the first connecting section 242 is coupled to the second connecting section 252, and the first connecting section 242 and the second connecting section 252 are electrically connected to the main board respectively. The first connecting section 242 and the second connecting section 252 are coupled to connect the first flexible printed circuit 240 and the second flexible printed circuit 250 into a whole, so that centralized arrangement of the first flexible printed circuit 240 and the second flexible printed circuit 250 is facilitated, assembling of the light source 230, the camera assembly 220 and the main board is simplified, and the image acquisition module 200 is able to get rapidly assembled to the terminal device 100. In addition, when a part of assembly such as the light source 230 is damaged, the light source 230 can be replaced only by disconnecting the first flexible printed circuit 240 from the light source 230, so that convenience for operation is ensured.

In combination with FIG. 3, in one embodiment, the light transmission member 212 includes a first mounting portion 2121, the first mounting portion 2121 is provided with a receiving groove 21211, and a part of the structure of the pedestal 211 is arranged at a groove opening of the receiving groove in a covering manner to define the receiving cavity. An enough receiving space is provided for the camera assembly 220 by use of the receiving groove 21211 of the first mounting portion 2121. In addition, since the camera assembly 220 is received in the receiving cavity, when the light emitted by the light source 230 is transmitted to the outside by the light transmission member 212, a relatively good light effect is achieved around the camera assembly 220.

In some exemplary embodiments, the groove opening of the receiving groove 21211 is opposite to a side where the incident face 220 is positioned, and then the camera assembly 220, when being arranged, can be placed into the receiving groove 21211 from a direction of the side where the incident face 220a is positioned, so that most of the structure of the camera assembly 220 is wrapped with the light transmission member 212, and furthermore, when the light emitted by the light source 230 is transmitted by the light transmission member 212, a better glare effect is achieved around the camera assembly 220.

In one embodiment, the first mounting portion 2121 includes a top end face 2121a, a front end face 2121b and a bottom end face 2121c which are sequentially abutted, and the incident face 220a exposes from the front end face 2121b to meet the shooting requirement of the camera assembly 220. It is to be noted that, since the incident face 220a exposes from the side where the first face 101 is positioned after the image acquisition module 200 moves relative to the terminal device 100 to the second position, shooting towards the side where the first face 101 is positioned may be implemented. In such case, the light transmission member 212 may transmit the beam emitted by the light source 230 to the outside for emission from the side where the front end face 2121b is positioned, and a relatively good light effect may further be achieved around the camera assembly 220.

In some exemplary embodiments, the light transmission member 212 includes a second mounting portion 2122, the second mounting portion 2122 is coupled to the bottom end face 2121c, the light source 230 is arranged at the second mounting portion 2122, the light emitted by the light source 230 is incident towards the side where the bottom end face 2121c is positioned till the second mounting portion 2122, thereby lighting the first mounting portion 2121, and the light is transmitted by the first mounting portion 2121 and emitted from the side where the incident face 220a is positioned to achieve a relatively good light effect.

In some exemplary embodiments, the light transmission member 212 is provided with a sunken region, and at the second position, a part of structures of the first connecting section 242 and the second connecting section 252 are received in the sunken region. In such an arrangement manner, when the image acquisition module 200 is at the second position, the first flexible printed circuit 240, the second flexible printed circuit 250 and the light transmission member 212 are more compact, so that an internal arrangement space of the terminal device 100 is effectively saved for lightening and thinning design of the terminal device 100.

The sunken region can be formed by step connection of the second mounting portion 2122 to the bottom end face 2121c. To be precise, the bottom end face 2121c and a face of the second mounting portion 2122 define the sunken region.

As shown in FIG. 3, the second mounting portion 2122 is provided with an accommodation groove 2122a, and the light source 230 is arranged in the accommodation groove 2122a. A sunken region 2122b communicated with the accommodation groove 2122a is defined in the second mounting portion 2122, and, the first flexible printed circuit 240 is partially accommodated in the sunken region 2122b and electrically connected to the light source 230. Under such structural arrangement, it is ensured that the light emitted by the light source 230 can be incident to the light transmission member 212 well; and in addition, the structures of the light source 230 and the second mounting portion 2122 are more compact, and the size of the whole image acquisition module 200 is reduced, so that a space required by arrangement of the image acquisition module 200 in the terminal device 100 is as small as possible, which is adoptable for lightening and thinning design of the terminal device 100.

Furthermore, in the embodiment that the first flexible printed circuit 240 has the first retractable section 241, the first retractable section 241 is able to bend to wrap the second mounting portion 2122, thereby making the structure more compact. In such an arrangement manner, when the first retractable section 241 extends or retracts along with movement of the image acquisition module 200 relative to the terminal device 100, the first flexible printed circuit 240 may extend and retract stably without interference with the second mounting portion 2122 to avoid influence on the effect of movement of the image acquisition module 200 relative to the terminal device 100.

In one embodiment, the receiving groove 21211 passes through the top end face 2121a, the pedestal 211 includes an end cover 2111, and the end cover 2111 is arranged on the top end face 2121a in the covering manner, thereby covering the receiving groove 21211 from a side where the top end face 2121a is positioned and making the whole appearance of the mounting seat 210 more attractive. In addition, the end cover 2111 may also achieve a shading effect to prevent the light transmitted by the light transmission member 212 from being emitted from the side where the top end face 2121a is positioned and ensure that the light can be emitted from the side where the front end face 2121b is positioned as much as possible to effectively achieve a light effect on the side where the incident face 220a is positioned.

Figure 5:
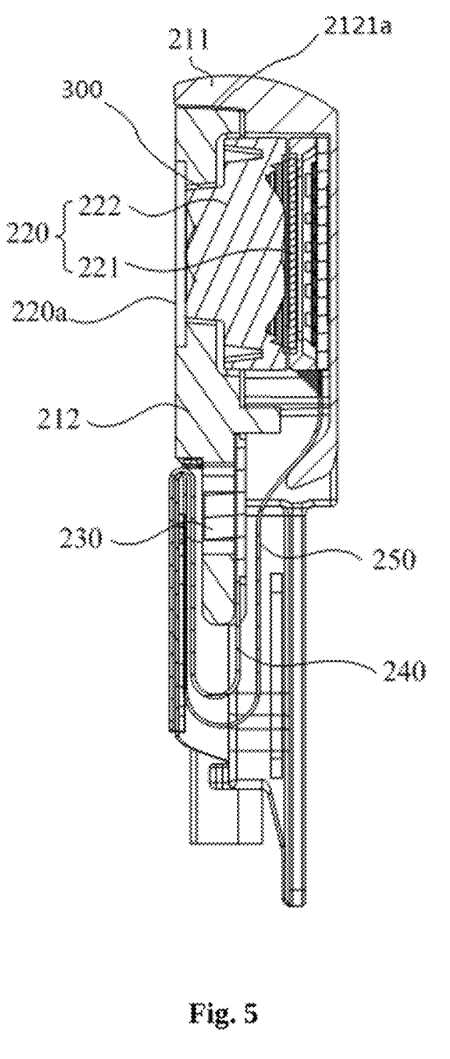
FIG. 5 is a sectional structure diagram of the image acquisition module shown in FIG. 4 along line I-I.

In combination with FIG. 5, in one embodiment, the camera assembly 220 includes an inductive sensor 221 and a lens group 222, and the inductive sensor 221 is electrically connected to the second flexible printed circuit 250, so that, when the image acquisition module 200 is assembled to the terminal device 100, the second flexible printed circuit 250 can be coupled the main board in the terminal device 100 to electrically connect the inductive sensor 221 with the main board to further transmit data or currents. In the exemplary embodiment, external light can be incident to the inductive sensor 221 through the lens group 222. The first mounting portion 2121 is provided with a bayonet communicated with the receiving groove 21221; and the lens group 222 is arranged at the bayonet. By the bayonet, the camera assembly 2210 is able to get positioned on one hand, and on the other hand, a clearance space may also be provided for the lens group 222, the lens group 222 being positioned at the bayonet, so that, when the light emitted by the light source 230 is incident to the light transmission member 212, the light transmission member 212 may lead the light out to form a light ring around the lens group 222 to achieve a relatively good glowing effect.

Figure 6:
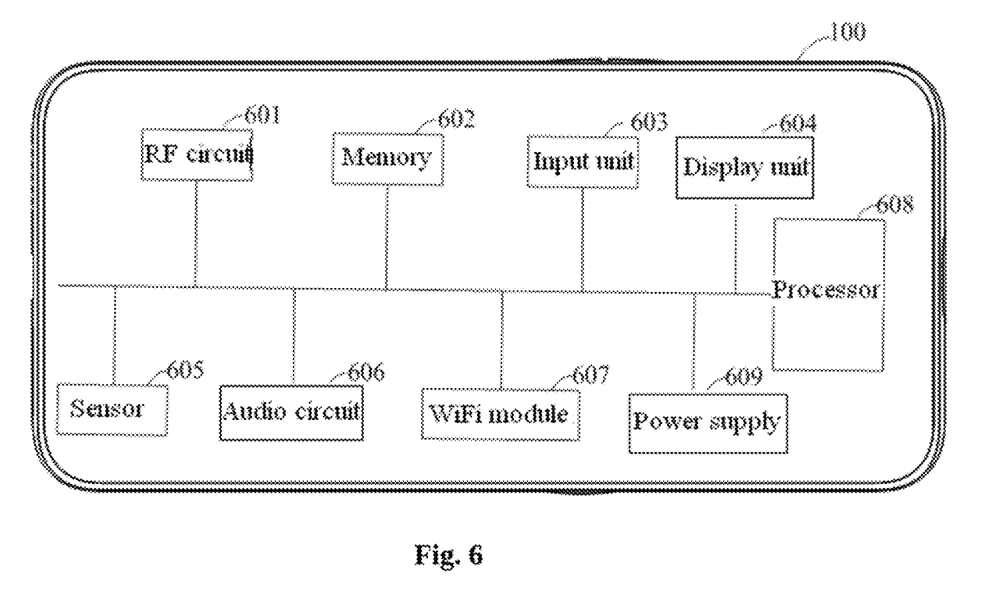
FIG. 6 is a structure diagram of a terminal device according to an embodiment of the present disclosure.

Referring to FIG. 6, FIG. 6 is a structure of a terminal device 100 according to an embodiment of the present disclosure. The terminal device 100 includes assemblies such as a Radio Frequency (RF) circuit 601, and one or more than one computer-readable storage medium including a memory 602, an input unit 603, a display unit 604, a sensor 604, an audio circuit 606, a Wireless Fidelity (WiFi, Wireless Fidelity) module 607, a processor 608 including a plurality of processing cores, and a power supply 609. Those skilled in the art should know that the structure of the terminal device 100 shown in FIG. 6 is not intended to limit the terminal device 100 and may include assemblies more or fewer than those shown in the figure or some assemblies are combined or different assembly arrangements are adopted.

The RF circuit 601 is configured to receive and transmit information or receive and send a signal during a call, particularly, transmitting, after receiving downlink information of a base station, the downlink information to the plurality of processing cores of the processor 608 for processing and, in addition, sending involved uplink data to the base station. The RF circuit 601 usually includes, but not limited to, an antenna, at least one amplifier, a tuner, one or more oscillators, a Subscriber Identity Module (SIM, Subscriber Identity Module) card, a transceiver, a coupler, a Low Noise Amplifier (LNA, Low Noise Amplifier), a duplexer and the like. In addition, the RF circuit 601 can also communicate with a network and another device through wireless communication. Any communication standard or protocol can be adopted for wireless communication, including, but not limited to, a Global System of Mobile communication (GSM, Global System of Mobile communication), General Packet Radio Service (GPRS, General Packet Radio Service), Code Division Multiple Access (CDMA, Code Division Multiple Access), Wideband Code Division Multiple Access (WCDMA, Wideband Code Division Multiple Access), Long Term Evolution (LTE, Long Term Evolution), an electronic mail, Short Messaging Service (SMS, Short Messaging Service) and the like.

The memory 602 is configured to store an application program and data. The application program stored in the memory 602 includes an executable code. The application program is able to form various functional modules. The processor 608 runs the application program stored in the memory 602, thereby executing various functional present disclosures and data processing. The memory 602 mainly includes a program storage region and a data storage region. The program storage region stores an operating system, an application program required by at least one function (for example, a sound playing function and an image playing function) and the like. The data storage region may store data (for example, audio data and a phone book) created according to use of the terminal device 100 and the like. In addition, the memory 602 includes a high-speed random access memory and further includes a nonvolatile memory, for example, at least one disk storage device, flash memory device or other volatile solid-state storage device. Correspondingly, the memory 602 further includes a memory controller for providing access to the memory 602 for the processor 608 and the input unit 603.

The input unit 603 is configured to receive input digital and character information or user characteristic information (for example, a fingerprint) and generate keyboard, mouse, joystick and optical trackball signal input related to user setting and function control. Specifically, in a specific embodiment, the input unit 603 includes a touch-sensitive face and other input devices. The touch-sensitive face, also called a touch display screen or a touch panel, can collect a touch operation of a user thereon or nearby (for example, an operation executed by the user with any proper object or accessory such as a finger and a stylus on the touch-sensitive face or nearby the touch-sensitive face) and drive a corresponding connection device according to a preset program. Optionally, the touch-sensitive face includes two parts, i.e., a touch detection device and a touch controller. The touch detection device detects a touch direction of the user, detects a signal generated by the touch operation and transmits the signal to the touch controller. The touch controller receives touch information from the touch detection device, converts it into a touch point coordinate and transmits it to the processor 608, and may receive and execute a command sent by the processor 608.

The display unit 604 is configured to display information input by the user or information provided for the user and various graphical user interfaces of the terminal device 100. These graphical user interfaces is formed by graphics, texts, icons, videos and any combination thereof. The display unit 604 includes a display panel. Optionally, the display panel is configured in form of a Liquid Crystal Display (LCD, Liquid Crystal Display) and an Organic Light-Emitting Diode (OLED, Organic Light-Emitting Diode). Furthermore, the touch-sensitive face can be covered by the display panel. After detecting the touch operation thereon or nearby, the touch-sensitive face transmits it to the processor 608 to determine a type of a touch event. Then, the processor 608 provides corresponding visual output on the display panel according to the type of the touch event. In FIG. 6, the touch-sensitive face and the display panel realize input and output functions as two independent assemblies. However, in some embodiments, the touch-sensitive face and the display panel may be integrated to realize the input and output functions. It can be understood that the display screen 110 includes the input unit 603 and the display unit 604.

The terminal device 100 further includes at least one sensor 605, for example, a light sensor, a motion sensor and another sensor. Specifically, the light sensor includes an ambient light sensor and a proximity sensor. The ambient light sensor can regulate brightness of the display panel according to brightness of ambient light, and the proximity sensor can turn off the display panel and/or backlight when the terminal device 100 is moved to an ear of a user. As a motion sensor, a gravitational acceleration sensor can detect a magnitude of an acceleration in each direction (usually three axes), can detect a magnitude and direction of the gravity under a motionless condition, and is configured for an present disclosure recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the terminal device 100 will not be elaborated herein.

The audio circuit 606 provides an audio interface between the user and the terminal device 100 by a loudspeaker and a microphone. The audio circuit 606 can convert received audio data into an electric signal for transmission to the speaker, and the speaker converts it into a sound signal for output. On the other hand, the microphone converts a collected sound signal into an electric signal, the audio circuit 606 receives and converts it into audio data, and the audio data is output to the processor 608 for processing and sent to, for example, another terminal device 100 through the RF circuit 601, or the audio data is output to the memory 602 for further processing. The audio circuit 606 further includes an earphone jack for providing communication between an external earphone and the terminal device 100.

WiFi relates to a short-distance wireless transmission technology. The terminal device 100 can help the user receive and send an electronic mail, browse a webpage, access streaming media and the like through the WiFi module 607, and wireless wideband Internet access is provided for the user. Although the WiFi module 607 is shown in FIG. 6, it can be understood that it is not a necessary composition of the terminal device 100 and may completely be omitted according to a requirement without changing the scope of the essence of the invention.

The processor 608 is a control center of the terminal device 100 and connects each part of the terminal device 100 by use of various interfaces and lines and executes various functions and data processing of the terminal device 100 by running or executing the application program stored in the memory 602 and calling data stored in the memory 602, thereby monitoring the whole terminal device 100. Optionally, the processor 608 includes a plurality of processing cores. Preferably, the processor 608 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 608.

The terminal device 100 further includes the power supply 609 supplying power to each assembly. Preferably, the power supply is logically connected with the processor 608 by a power management system, thereby realizing functions of charging and discharging management, power consumption management and the like by the power management system. The power supply 609 further includes one or more than one direct current or alternating current power supply, rechargeable system, power failure detection circuit, power converter or inverter and power state indicator and any other assembly.

Although not shown in FIG. 6, the terminal device 100 further includes a Bluetooth module and the like, which will not be elaborated herein. During specific implementation, each of the modules is implemented as an independent entity, and may also be freely combined for implementation as the same or a plurality of entities. Specific implementation of each of the modules may refer to the method embodiment and will not be elaborated herein.

Each technical characteristic of the embodiments is freely combined. For brief description, not all possible combinations of each technical characteristic in the embodiments are described, but all the combinations of these technical characteristics shall fall within the scope recorded in the specification without conflicts.

The embodiments only express some exemplary embodiments of the present disclosure, and relatively specific and detailed descriptions are made thereto but should not thus be understood as limits to the scope of the present disclosure. It is to be pointed out that those of ordinary skill in the art may further make a plurality of transformations and improvements without departing from the concept of the present disclosure and all of them fall within the scope of protection of the present disclosure. Therefore, the scope of protection of the present disclosure shall be subject to the appended claims.

What is claimed is:

1. An image acquisition module, comprising:
    a mounting seat comprising a pedestal and a light transmission member, the light transmission member being coupled to the pedestal, wherein the pedestal and the light transmission member cooperatively define a receiving cavity;
    a camera assembly having an incident face, the camera assembly being arranged in the receiving cavity and the incident face exposing from the light transmission member; and
    a light source configured to emit light transmitting through the light transmission member;
    wherein the light transmission member comprises a first mounting portion, the first mounting portion is provided with a receiving groove, and a part of a structure of the pedestal is arranged at a groove opening of the receiving groove in a covering manner to define the receiving cavity;
    wherein the first mounting portion comprises a top end face, a front end face and a bottom end face which are sequentially abutted, the top end face is parallel to the bottom end face, the incident face exposes from the front end face, the light transmission member comprises a second mounting portion, the second mounting portion is protruded from the bottom end face, the light source is arranged at an accommodation groove of the second mounting portion, and the light emitted by the light source is transmittable towards a side where the incident face and the bottom end face positioned till the second mounting portion;
    wherein the camera assembly comprises an inductive sensor and a lens group, and the lens group enables external light to get incident to the inductive sensor: and the first mounting portion is provided with a bayonet communicated with the receiving groove, and the lens group is arranged at the bayonet; a first flexible printed circuit, wherein the first flexible printed circuit is electrically connected to the light source, the first flexible printed circuit has a first retractable section, and the first retractable section is able to bend to wrap the second mounting portion; a second flexible printed circuit, wherein the second flexible printed circuit is electrically connected to the inductive sensor, the second flexible printed circuit has a second retractable section, and the second retractable section is able to bend to wrap the first retractable section.

2. The image acquisition module of claim 1, wherein the receiving groove passes through the top end face, the pedestal comprises an end cover, and the end cover is arranged on the top end face in a covering manner.

3. The image acquisition module of claim 1, wherein the first flexible printed circuit has a first connecting section coupled to the first retractable section, the second flexible printed circuit has a second connecting section coupled to the second retractable section, and the first connecting section is coupled to the second connecting section.

4. A mobile terminal, comprising:
    a terminal device, in which a mounting groove is defined; and
    an image acquisition module of claim 1;
    wherein at the first position, the mounting groove accommodates the image acquisition module and the incident face is kept hidden in the terminal device; and at the second position, the image acquisition module extends from the mounting groove, and the incident face exposes from the terminal device.

5. The mobile terminal of claim 4, wherein the terminal device comprises a first face, a second face opposite the first face, and a lateral peripheral face coupled between the first face and the second face; at the second position, the incident face exposes from the first face.

6. The mobile terminal of claim 5, wherein the terminal device comprises a display screen, and a display region of the display screen faces a side where the first face positioned or a side where the second face positioned.

7. The mobile terminal of claim 5, wherein the terminal device comprises a display screen, the display screen has a first display region and a second display region, the first display region faces a side where the first face positioned, and the second display region faces a side where the second face positioned.

8. The mobile terminal of claim 4, wherein the image acquisition module comprises a first flexible printed circuit and a second flexible printed circuit, a main board is arranged in the terminal device, and the light source is electrically connected to the main board by the first flexible printed circuit; the camera assembly is electrically connected to the main board by the second flexible printed circuit; the first flexible printed circuit has a first retractable section, and the second flexible printed circuit has a second retractable section, when the image acquisition module moves relative to the terminal device, the first retractable section and the second retractable section extend or retract.

9. The mobile terminal of claim 8, wherein, at the first position, the first retractable section bends to wrap a part of a structure of the light transmission member.

10. The mobile terminal of claim 8, wherein, at the first position, the second retractable section bends to wrap the first retractable section.

11. The mobile terminal of claim 8, wherein the first flexible printed circuit has a first connecting section coupled to the first retractable section, the second flexible printed circuit has a second connecting section coupled to the second retractable section, the first connecting section is coupled to the second connecting section, and the first connecting section and the second connecting section are electrically connected to the main board respectively.

12. The mobile terminal of claim 11, wherein the light transmission member is provided with a sunken region, and at the second position, the sunken region accommodates the first connecting section and a part of the second connecting section.

13. A mobile terminal, comprising:
a terminal device, in which a mounting groove is defined; and
an image acquisition module of claim 1.

14. The mobile terminal of claim 13, wherein the terminal device comprises a first face, a second face opposite the first face, and a lateral peripheral face coupled between the first face and the second face.

15. The mobile terminal of claim 14, wherein the terminal device comprises a display screen, and a display region of the display screen faces a side where the first face positioned or a side where the second face positioned.

* * * * *